United States Patent
Ferragut, II

(10) Patent No.: US 6,882,280 B2
(45) Date of Patent: Apr. 19, 2005

(54) ELECTRONIC MESSAGE CENTER FOR A REFRIGERATOR

(75) Inventor: Nelson J. Ferragut, II, Williamsburg, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/195,607

(22) Filed: Jul. 15, 2002

(65) Prior Publication Data

US 2003/0010052 A1 Jan. 16, 2003

Related U.S. Application Data

(60) Provisional application No. 60/305,719, filed on Jul. 16, 2001.

(51) Int. Cl.$^7$ .............................................. G08B 17/00
(52) U.S. Cl. ..................................... 340/587; 340/692
(58) Field of Search ................................ 340/587, 585, 340/692, 691.1, 691.6; 369/30, 31

(56) References Cited

U.S. PATENT DOCUMENTS

| | | | |
|---|---|---|---|
| 3,836,221 A | | 9/1974 | Whistler, Jr. et al. |
| 3,851,939 A | * | 12/1974 | Benasutti et al. ........ 312/139.2 |
| 4,514,724 A | | 4/1985 | Valentine |
| 4,966,004 A | | 10/1990 | Midlang et al. |
| 4,970,870 A | * | 11/1990 | Midlang et al. ............... 62/126 |
| 5,387,108 A | | 2/1995 | Crowell |
| 5,577,918 A | | 11/1996 | Crowell |
| 5,894,275 A | * | 4/1999 | Swingle ....................... 340/692 |
| 5,903,869 A | | 5/1999 | Jacobson et al. |
| 6,249,765 B1 | * | 6/2001 | Adler et al. ................. 704/500 |
| 6,502,411 B1 | * | 1/2003 | Okamoto ..................... 62/129 |
| 6,532,004 B1 | * | 3/2003 | Harrison et al. ............. 345/169 |
| 6,651,218 B1 | * | 11/2003 | Adler et al. ................. 715/530 |
| 6,675,356 B1 | * | 1/2004 | Adler et al. ................. 715/530 |
| 2001/0052741 A1 | | 12/2001 | Yun |
| 2001/0054291 A1 | | 12/2001 | Roh et al. |

FOREIGN PATENT DOCUMENTS

| | | |
|---|---|---|
| AU | 200039364 | 6/2000 |
| DE | 3708722 | 10/1987 |
| EP | 0 965 795 A2 | 12/1999 |
| EP | 0 985 884 A2 | 3/2000 |
| EP | 1110627 | 6/2001 |
| EP | 1 176 377 A1 | 1/2002 |
| EP | 1221578 | 10/2002 |
| WO | WO 97/50045 | 12/1997 |

* cited by examiner

*Primary Examiner*—John Tweel, Jr.
(74) *Attorney, Agent, or Firm*—McKee, Voorhees & Sease, P.L.C.

(57) ABSTRACT

A refrigerator adapted for playing and recording voice messages is disclosed. The refrigerator includes a cabinet for enclosing a refrigerating compartment, the cabinet having a door for providing access to the refrigerating compartment, a message center operatively connected to the cabinet. The message center includes a speaker, a microphone, and a display.

21 Claims, 6 Drawing Sheets

US 6,882,280 B2

ELECTRONIC MESSAGE CENTER FOR A REFRIGERATOR

PRIORITY STATEMENT

This application claims priority to U.S. Provisional Patent Application No. 60/305,719 filed on Jul. 16, 2001, herein incorporated by reference in its entirety.

BACKGROUND OF THE INVENTION

The present invention relates to refrigerators. More particularly, the present invention relates to refrigerators that are adapted to record and play back audio messages.

Refrigerators store food as their primary function. Yet, this is not the only role that refrigerators play in many installations. People often use refrigerators in other ways. For example, notes are sometimes stuck on the refrigerator using magnets or otherwise. Although a convenient location to place notes or reminders for one another, this can result in a cluttered appearance created by paper notes adhered to the refrigerator or stuck to the refrigerator by magnets.

Therefore, it is a primary object of the present invention to improve upon the state of the art.

It is a further object of the present invention to provide a refrigerator and a message center for a refrigerator that does not require the cluttered appearance created by paper notes adhered to the refrigerator or stuck to the refrigerator with magnets.

Another object of the present invention is to provide a refrigerator with a message center that provides an indication it there are any messages.

It is a further object of the present invention to provide a refrigerator that is capable of recording and playing back audio messages.

These and/or other objects, features, and/or advantages of the present invention will be apparent from the following specification and claims.

SUMMARY OF THE INVENTION

The present invention provides for an appliance, such as a refrigerator, adapted for playing and recording audio messages. According to one aspect of the invention, the refrigerator includes a cabinet for enclosing a refrigerating compartment, the cabinet having a door for providing access to the refrigerating compartment. The refrigerator also includes a user interface operatively connected to the cabinet. This interface includes a speaker, a microphone, and a display and is adapted for receiving and playing audio messages and to indicate the presence of new messages. Instead of communicating by leaving notes that may or may not be seen, messages can be quickly recorded, stored and played back using the present invention.

According to another aspect of the invention, a display is used to display information about the voice messages. The same display can also be used for displaying refrigerator operation information. In addition, a message indicator can be used to indicate that one or more new messages are present. This alerts a user that they should check the messages.

DETAILED DESCRIPTION OF THE DRAWINGS

Figure 1:
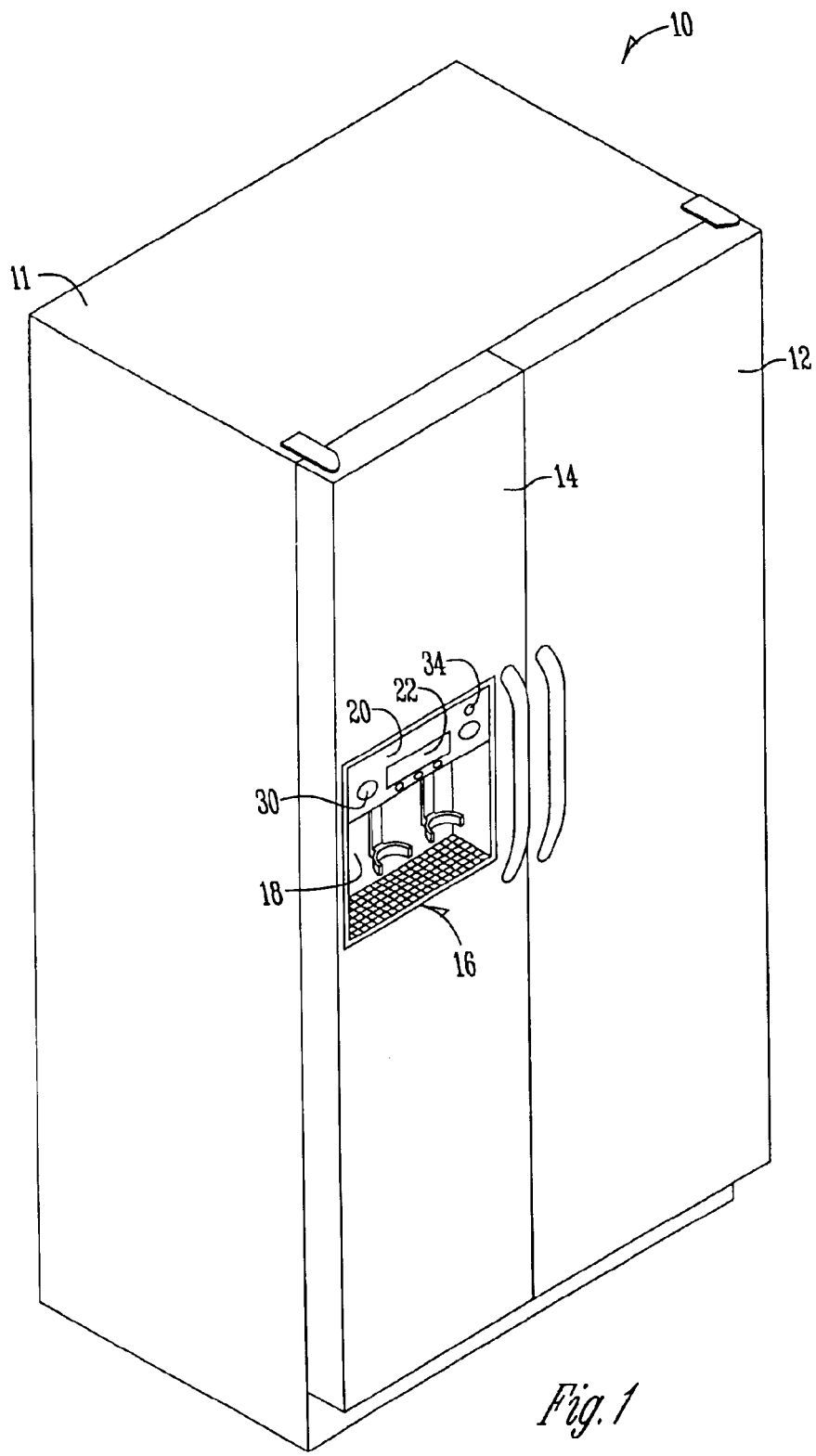
FIG. 1 is a perspective view of one embodiment of a refrigerator of the present invention.

FIG. 1 provides a perspective view of a refrigerator 10 having a side by side configuration. The refrigerator 10 includes a housing or cabinet 11. There is a refrigeration compartment door 12 and a freezer compartment door 14 to provide access to the refrigerator and freezer compartments 13, 15 within the cabinet 11. The freezer compartment door 14 contains a water and ice dispenser, generally shown at 16. The water and ice dispenser 16 include a lower receptacle 18 for receiving cups and dispensing water and ice. Above the receptacle 18 is an electronic message center 20. The message center 20 provides for storing and play back of audio messages. The message center 20 includes a display 22, one or more manual inputs such as button 30, and a message indicator 34 such as an LED.

Figure 2:
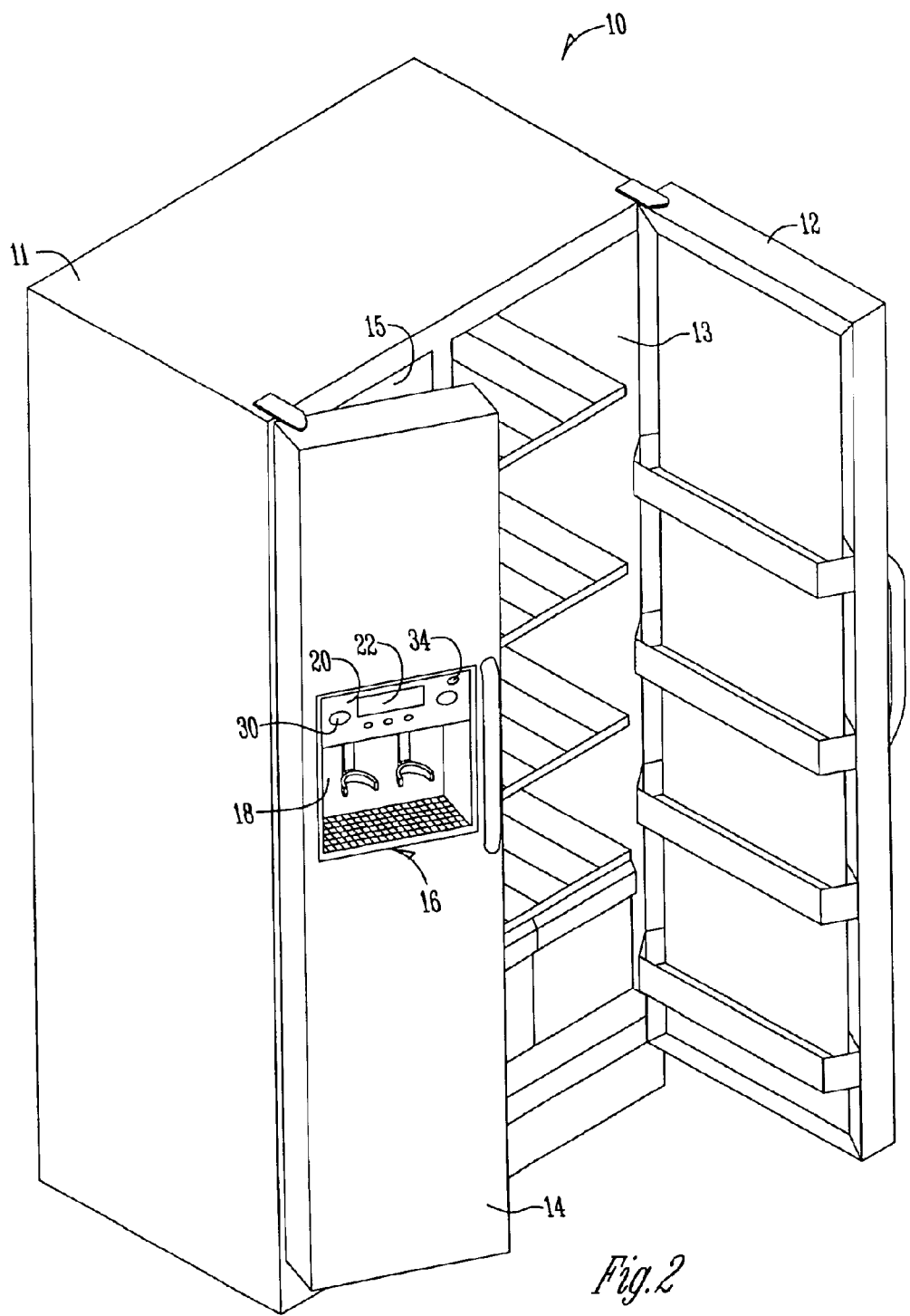
FIG. 2 is a perspective view of the embodiment of FIG. 1 showing the refrigerator with the doors open.

FIG. 2 illustrates the refrigerator 10 with an open refrigeration compartment door 12 and an open freezer compartment door 14. The open refrigeration compartment door 12 exposes the refrigeration compartment 13 within the cabinet 11. The open freezer door 14 exposes the freezer compartment 15 within the cabinet 11. Although it is preferable to place the message center 20 and receptacle 16 in the freezer compartment door 14, the present invention is not limited to any particular placement of either the water and ice dispenser 16 or the message center 20 or the various elements of the message center 20.

Figure 3:
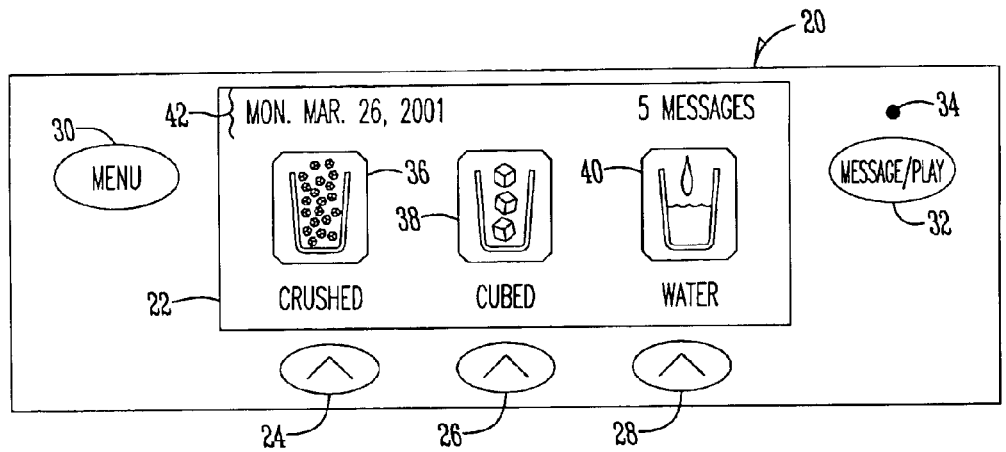
FIG. 3 is a diagram of a user interface according to one embodiment of the present invention where the display illustrates water and ice dispensement refrigerator functions.

FIG. 3 shows one view of the message center 20 and its accompanying user interface. The message center 20 includes a plurality of manual inputs, including buttons 24, 26, and 28 as well as a menu button 30 and a message/play button 32. As shown in FIG. 3, the display 22 is adapted for displaying refrigerator operation information. In particular, three icons are present. A first icon 36 is associated with dispensement of crushed ice. A second icon 38 is associated with dispensement of cubed ice. A third icon 40 is associated with dispensement of water. Each of the icons 36, 38, and 40 and its associated function is also associated with one of the buttons 24, 26, and 28, respectively such that pressing one of the buttons 24, 26, and 28, results in performing the associated refrigerator function. As shown, each of the icons 36, 38, and 40 also includes a textual label beneath it, "CRUSHED", "CUBED", and "WATER", respectively. The menu button 30 can be used to display any number of screens. Preferably, the use of the manual input buttons 24, 26, 28 is menu-driven so that the buttons allow for the selection of different functions based upon the currently displayed information on the display 22. Other display screens can provide for selecting a language in which to display information, setting date and time information, adjusting volume information, setting a timer, checking the status of a water filter, checking the status of an air filter, or other refrigerator functions.

A message indicator 34 such as an LED is also shown. The message indicator is used to indicate the presence or absence of unlistened to messages. Also shown in FIG. 3 is textual message status information 42 that extends across the top of the icons 36, 38, and 40. The message status information 42 provides a message date stamp indicating the date that the latest message was left and indicates that there are "5 MESSAGES" that have been stored in the message center 20. Other message status information can also be stored and/or displayed. For example, the electronic message center 20 is preferably programmed to retain the following information associated with each recorded message: (1) the weekday and time of day the message was recorded; (2) whether or not the message has been listened to or played back; and (3) whether or not the message has been recorded during the current user session.

Figure 4:
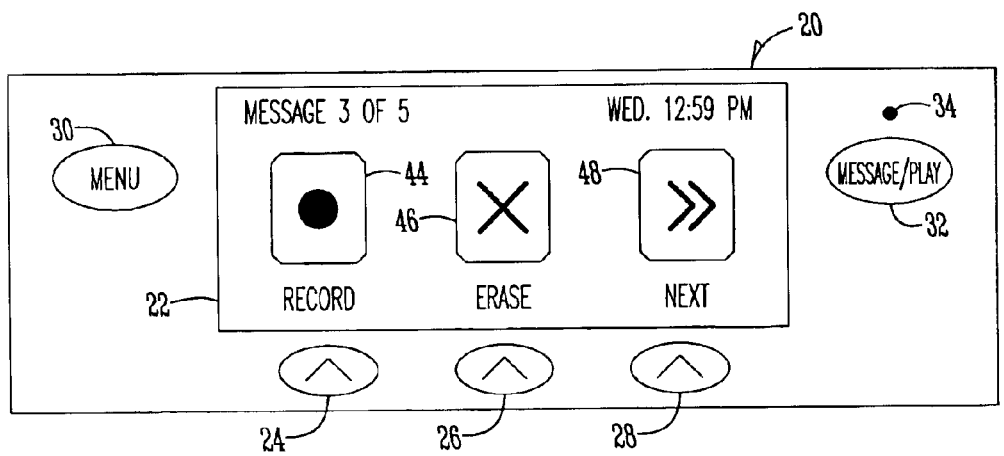
FIGS. 4, 5, and 6 are diagrams according to one embodiment of the present invention where the display shows message play back and record functions.

To begin a user session, a user presses the message button 32. This action takes the electronic message center 20 out of the default mode as shown in FIG. 3 and into a messaging mode such as is shown in FIG. 4. At the start of the user session, the message with the oldest date stamp that has not been heard is automatically selected and played back. If all the messages have already been heard, the oldest message is played. If there are no user messages then the message "no messages" is played. Pressing the message button 32 plays the currently selected message.

FIG. 4 illustrates one embodiment of the display 22 for the instance where there are multiple (in this case 5) messages recorded and the user is provided with the opportunity to listen to the next message, erase the previous message or record a new message. The "RECORD" icon 44 indicates that when the button 24 is pressed (button 24 is located immediately below and therefore associated with icon 44), the message center 20 will be actuated to record a message by the user. The present invention is in no way limited to any particular audio message, but contemplates that such messages might include messages about meals, food in the refrigerator, or any other message. The "ERASE" icon 46 indicates that pressing a center button 26 results in erasing a message. The "NEXT" icon 48 indicates that pressing the associated right hand button 28 will play the next message.

Figure 5:
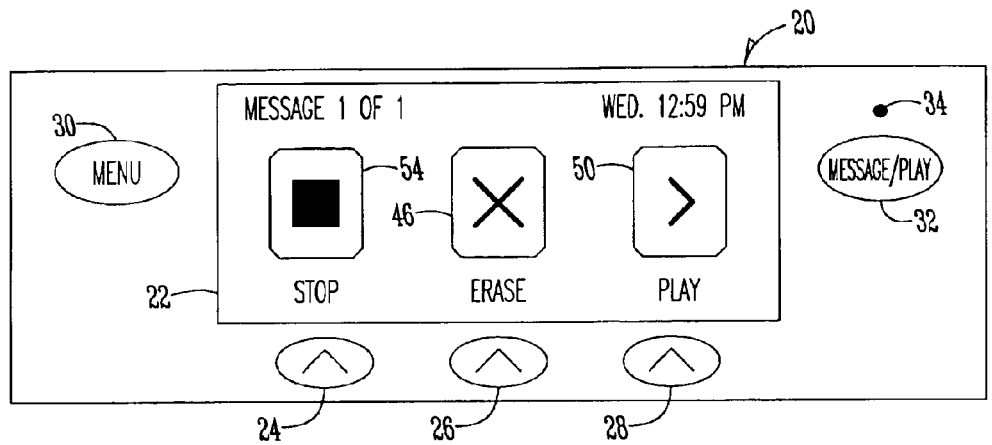

FIG. 5 illustrates a screen display for the message center 20 that is displayed when a user is recording a message into the message center 20. There is a "PLAY" icon 50 which indicates that pressing the lower button 28 will play a message. The "STOP" icon 54 indicates that pressing button 24, will stop the current message from being recorded. The "ERASE" icon 46 will erase the message being recorded. The message indicator 34 will blink to indicate the presence of messages that have been recorded in the message center 20 but have not yet been played back.

Figure 6:
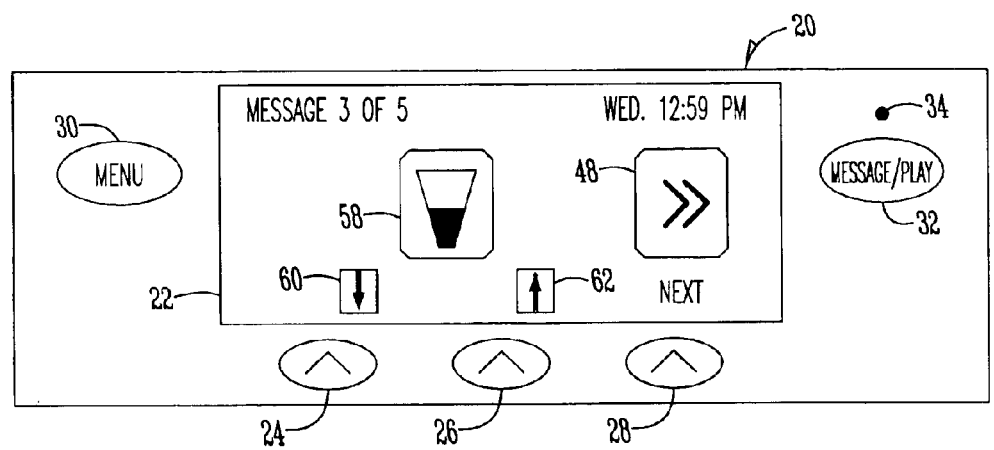

FIG. 6 depicts an embodiment of the user interface for the display 22 of the message center 20 which is normally displayed during play back of the previously recorded message. The "NEXT" icon 48 indicates that pressing the associated button 28 will advance the play back to the next recorded message. The volume icon 58 graphically indicates the current volume for play back while the directional icons 60 and 62 indicate that pressing the buttons 24, 26 will adjust the volume of the play back downwardly or upwardly as desired.

Figure 7:
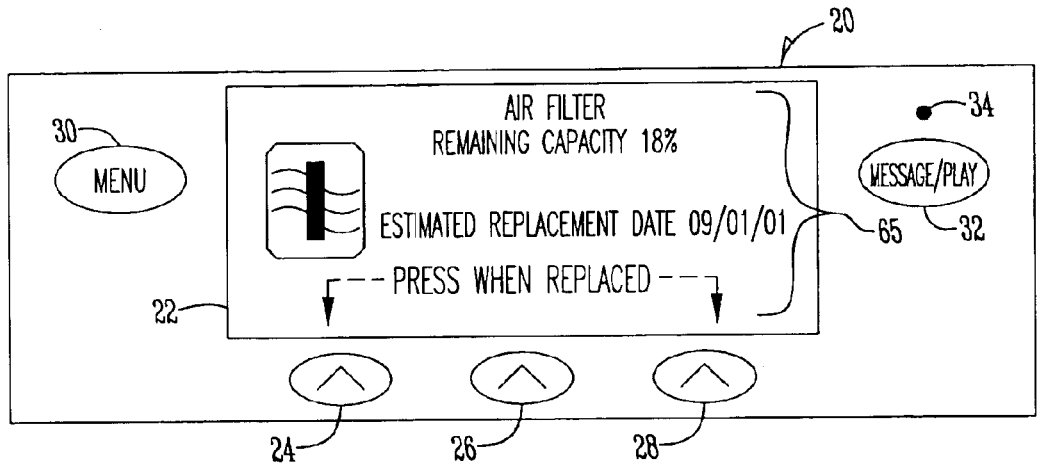
FIG. 7 is a diagram of a user interface according to one embodiment of the present invention where the display illustrates air filter replacement information.

FIG. 7 illustrates another embodiment of the display 22 of the message center 20 which is adapted to provide a user interface for air filter replacement. The display 22 includes air filter information 65. This information can include the remaining capacity of an air filter and/or an estimated replacement date. Thus, the display 22 provides for the display of refrigerator operation information in addition to message recording and playback information.

Figure 8:
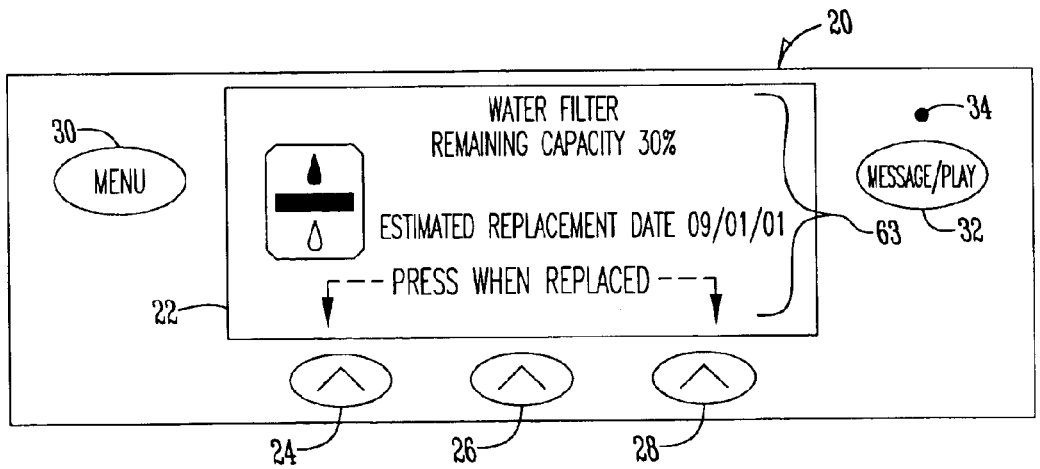
FIG. 8 is a diagram of a user interface according to one embodiment of the present invention where the display illustrates water filter replacement information.

FIG. 8 illustrates another embodiment of the display 22 of the message center 20 is adapted to provide a user interface for water filter replacement. The display 22 includes water filter information 65. This information can include the remaining capacity of a water filter, an estimated order date by which the water filter should be ordered in order to obtain it prior to an estimated replacement date, and/or the estimated replacement date. This is another example of how the display 22 provides for the display of refrigerator operation information in addition to message recording and playback information.

Figure 9:
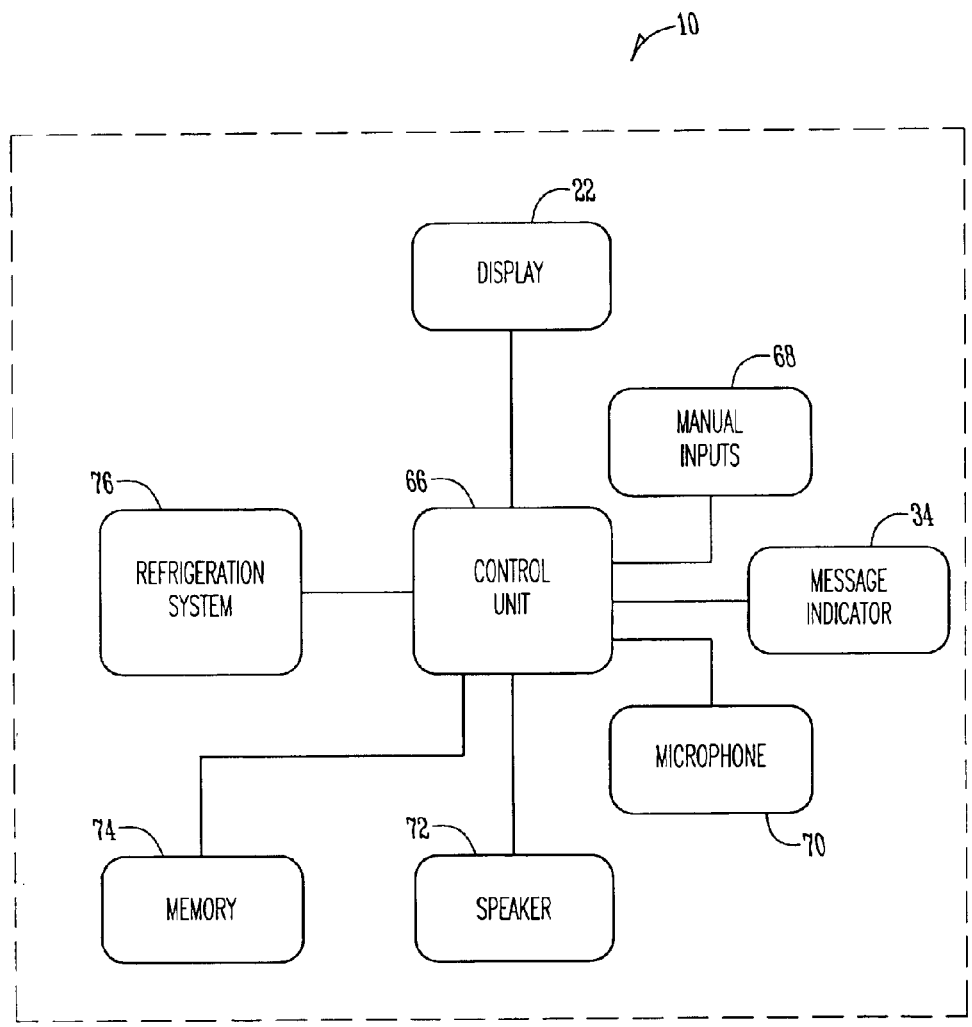
FIG. 9 is a block diagram of the interrelated features and functions of the present invention.

FIG. 9 provides a block diagram illustrating structure of the present invention. The refrigerator 10 includes a control unit 66. The control unit 66 preferably includes an intelligent control such as a microcontroller or processor, however, the present invention contemplates that any type of control unit can be used as may be appropriate in a particular design. The control unit 66 is electrically connected to a display 22. The display 22 can be used to display either refrigerator operations or functions or message center functions or operations. Preferably, the display 22 is a LCD panel type display, however, the present invention contemplates that other types of displays may be used, such as may be appropriate or desirable in a particular application. The control unit 66 is also electrically connected to manual inputs 68. The manual inputs 68 can include the buttons 24, 26, 28, 30, and 32 (as shown in FIGS. 3-8). The manual inputs 68 need not be separate buttons, but can be incorporated into a touch screen display, or otherwise provided. The control unit 66 can also be used to control refrigerator functions. The control unit 66 is electrically connected to the refrigeration system 76 such that the control unit 66 can control the dispensement of ice, the dispensement of water, or other refrigerator functions. In addition, the control unit 66 is electrically connected to a microphone 70 used to transduce voice or other sound information. The control unit 66 is also electrically connected to a speaker 72 which is used to transduce sound information to play back audio messages. The control unit 66 is also electrically connected to a memory 74. The memory 74 is used to store one or more audio messages. The present invention contemplates that message playback, record, and memory functions can be implemented in the control unit through use of integrated circuits such as, but not limited to, those available from Integrated Storage Devices, Inc. (ISD).

Thus, an electronic message center for a refrigerator has been disclosed. The present invention contemplates variations including the type of display, the type of refrigerator functions performed, the placement of the display, the number and placement of manual inputs, the type of and placement of a message indicator, and other variations within the spirit and scope of the invention. Also, the message center can be incorporated into other appliances and be used in conjunction with the functions of a particular appliance.

What is claimed is:

1. A refrigerator adapted for playing and recording voice messages, comprising:
　　a cabinet for enclosing a refrigerating compartment, the cabinet having a door for providing access to the refrigerating compartment;
　　a message center operatively connected to the cabinet having a speaker, a microphone, and a display, and adapted for receiving and playing audio messages; and a control unit disposed within the refrigerator and operatively connected to the display and adapted for controlling the display to provide a first screen having a set of audio message function selections and a second screen having a plurality refrigerator operation function selections.

2. A refrigerator of claim 1 wherein the message center is built into the door.

3. The refrigerator of claim 1 wherein the message center includes a message indicator for indicating that an unplayed message is present.

4. The refrigerator of claim 1 wherein the control unit includes a memory for storing audio messages.

5. A refrigerator comprising:

a housing;

a refrigeration compartment disposed within the housing;

a refrigeration system operatively connected to the refrigeration compartment for refrigerating the compartment;

a control unit disposed within the housing electrically connected to the refrigeration system;

a speaker electrically connected to the control unit;

a microphone electrically connected to the control unit;

a memory electrically connected to the control unit;

wherein the control unit is adapted to receive an audio message from a user through the microphone, store the audio message in the memory, and play the audio message through the speaker;

wherein the control unit is further adapted to control refrigerator operation functions including dispensement functions.

6. The refrigerator of claim 5 further comprising a display operatively connected to the control unit.

7. The refrigerator of claim 6 wherein the control unit is adapted for displaying a time associated with the audio message.

8. The refrigerator of claim 6, wherein the housing includes a door and the display is operatively connected to the door.

9. The refrigerator of claim 5 further comprising a keypad operatively connected to the control unit.

10. The refrigerator of claim 5 further comprising a message indicator operatively connected to the control unit.

11. The refrigerator of claim 5 wherein the housing includes a door and the speaker and microphone are operatively connected to the door.

12. An electronic message center for an appliance, comprising:

a housing;

a control unit disposed within the housing and adapted for controlling appliance operation;

a speaker electrically connected to the control unit for playing voice messages;

a microphone electrically connected to the control unit for receiving voice messages;

a memory electrically connected to the control unit for storing voice messages;

a display electrically connected to the control unit for displaying voice message information and adapted for displaying operational information of the appliance.

13. The electronic message center of claim 12 wherein the appliance is a refrigerator, and the operational information includes a selection for dispensing ice.

14. The electronic message center of claim 12 wherein the appliance is a refrigerator and the operational information includes a selection for dispensing water.

15. The electronic message center of claim 12 wherein the appliance is a refrigerator and the operational information includes filter information.

16. The electronic message center of claim 12 further comprising a plurality of manuals inputs operatively connected to the control unit.

17. The electronic message center of claim 12 wherein the control unit is adapted for controlling at least one appliance function.

18. The electronic message center of claim 17 wherein the appliance is a refrigerator, and the function is selected from the set comprising dispensing of water, dispensing of cubed ice, and dispensing of crushed ice.

19. The electronic message center of claim 12 wherein the voice message information is selected from the set comprising a total number of voice messages, a date, and a time.

20. A refrigerator comprising:

a cabinet for enclosing a refrigerating compartment, the cabinet having a door for providing access to the refrigerating compartment;

an ice dispenser disposed in the door;

a display disposed in the door;

a control unit operatively connected to the ice dispenser and the display;

a speaker operatively connected to the control unit;

a microphone operatively connected to the control unit;

the control unit providing both voice messaging and refrigerator operation control by instructing the display to display a screen selected from a set comprising: (a) a voice message playback screen, (b) an ice dispensement screen and receiving a press of at least one of the plurality of buttons to activate a function associated with the screen, and (c) a filter information screen.

21. A refrigerator adapted for playing and recording voice messages, comprising:

a cabinet for enclosing a refrigerating compartment, the cabinet having a door for providing access to the refrigerating compartment;

a user interface integrated into the door and having a speaker, a microphone, and a display;

the user interface dedicated to providing monitoring and control of refrigerator operations and functions, including audio messaging functions;

wherein the user interface is adapted for displaying on the display (a) a voice message playback screen and (b) an ice dispensement screen.

* * * * *